(12) United States Patent
Moroniti et al.

(10) Patent No.: US 12,053,139 B2
(45) Date of Patent: Aug. 6, 2024

(54) ROBOTIC APPARATUS, METHOD, AND APPLICATIONS

(71) Applicant: Maidbot, Inc., Austin, TX (US)

(72) Inventors: David Moroniti, Austin, TX (US); Steve Supron, Ithaca, NY (US); Steven Whitehead, Austin, TX (US); Micah Green, Austin, TX (US)

(73) Assignee: TAILOS, INC., Austin, TX (US)

( * ) Notice: Subject to any disclaimer, the term of this patent is extended or adjusted under 35 U.S.C. 154(b) by 518 days.

(21) Appl. No.: 17/347,477

(22) Filed: Jun. 14, 2021

(65) Prior Publication Data

US 2021/0298547 A1 Sep. 30, 2021

Related U.S. Application Data

(63) Continuation of application No. 16/162,463, filed on Oct. 17, 2018, now Pat. No. 11,058,270.
(Continued)

(51) Int. Cl.
| | | |
|---|---|---|
| *A47L 9/00* | (2006.01) | |
| *A47L 9/28* | (2006.01) | |

(Continued)

(52) U.S. Cl.
CPC ............ *A47L 9/009* (2013.01); *A47L 9/2805* (2013.01); *A47L 9/2831* (2013.01); *A47L 9/2852* (2013.01); *B60K 7/0007* (2013.01); *G05D 1/0219* (2013.01); *G05D 1/027* (2013.01); *G05D 1/0272* (2013.01); *A47L 2201/00* (2013.01); *A47L 2201/04* (2013.01)

(58) Field of Classification Search
CPC .. A47L 2201/00; A47L 2201/04; A47L 9/009; A47L 9/2805; A47L 9/2831; A47L 9/2852; B60K 7/0007; G05D 1/0219; G05D 1/027; G05D 1/0272; G05D 2201/0215
See application file for complete search history.

(56) References Cited

U.S. PATENT DOCUMENTS

| | | | | |
|---|---|---|---|---|
| 2 A | * | 7/1836 | Goulding | ............... D01G 21/00 57/58.49 |
| 4,598,782 A | * | 7/1986 | Ilon | ..................... B60L 15/2036 180/7.1 |

(Continued)

FOREIGN PATENT DOCUMENTS

| | | | |
|---|---|---|---|
| CN | 204071957 | | 1/2015 |
| CN | 204071957 U | * | 1/2015 |

(Continued)

OTHER PUBLICATIONS

CN-204071957-U—English Machine Translation (Year: 2015).*
(Continued)

*Primary Examiner* — Marc Carlson
(74) *Attorney, Agent, or Firm* — Fenwick & West LLP

(57) ABSTRACT

A robotic vacuum cleaner equipped with a holonomic drive that can drive in a given direction, e.g., north (with its assigned orientation being north) and move in a different direction, e.g., east, north-east, or any direction) while maintaining its assigned orientation or that of any desired portion of the robot such as an intake, bank of sensors, or any other portion of the robot that is needed for a particular maneuver.

5 Claims, 5 Drawing Sheets

Related U.S. Application Data

(60) Provisional application No. 62/574,255, filed on Oct. 19, 2017, provisional application No. 62/573,355, filed on Oct. 17, 2017.

(51) Int. Cl.
*B60K 7/00* (2006.01)
*G05D 1/00* (2006.01)
*G05D 1/02* (2020.01)

(56) References Cited

U.S. PATENT DOCUMENTS

| | | | | |
|---|---|---|---|---|
| 5,374,879 | A * | 12/1994 | Pin | G05D 1/0272 |
| | | | | 180/21 |
| 5,621,291 | A * | 4/1997 | Lee | G05D 1/0272 |
| | | | | 318/587 |
| 5,701,966 | A * | 12/1997 | Amico | B62D 57/00 |
| | | | | 180/6.66 |
| 6,883,201 | B2 * | 4/2005 | Jones | A47L 11/282 |
| | | | | 15/319 |
| 7,113,847 | B2 * | 9/2006 | Chmura | A47L 5/36 |
| | | | | 701/301 |
| 7,559,385 | B1 * | 7/2009 | Burt | B60K 7/0007 |
| | | | | 901/1 |
| 7,568,536 | B2 * | 8/2009 | Yu | B60T 7/22 |
| | | | | 318/587 |
| 8,292,776 | B1 * | 10/2012 | Higman | B60K 7/0007 |
| | | | | 180/372 |
| 8,833,862 | B2 * | 9/2014 | Gunther | B60B 19/125 |
| | | | | 301/5.23 |
| 9,033,079 | B2 * | 5/2015 | Shin | B60K 17/043 |
| | | | | 180/65.6 |
| 9,521,934 | B1 * | 12/2016 | Ebrahimi Afrouzi | A47L 9/00 |
| 10,470,630 | B2 * | 11/2019 | Sauer | A47L 9/0494 |
| 10,800,527 | B2 * | 10/2020 | Puthiyaveettil | B60B 19/003 |
| 11,007,635 | B2 * | 5/2021 | Georgeson | B08B 1/008 |
| 2002/0112899 | A1 * | 8/2002 | Dijksman | A47L 9/009 |
| | | | | 180/7.1 |
| 2007/0244610 | A1 * | 10/2007 | Ozick | A47L 11/24 |
| | | | | 342/417 |
| 2009/0314318 | A1 * | 12/2009 | Chang | A47L 11/40 |
| | | | | 134/58 R |
| 2012/0181099 | A1 | 7/2012 | Moon et al. | |
| 2014/0278221 | A1 * | 9/2014 | Troy | G01N 29/265 |
| | | | | 702/151 |
| 2016/0309973 | A1 * | 10/2016 | Sheikh | A47L 11/4066 |
| 2018/0020894 | A1 * | 1/2018 | Sauer | A47L 9/1445 |
| | | | | 15/319 |
| 2018/0098675 | A1 * | 4/2018 | Sauer | A47L 9/2873 |
| 2019/0110652 | A1 * | 4/2019 | Moroniti | A47L 9/2831 |
| 2019/0133401 | A1 | 5/2019 | Zita et al. | |
| 2020/0216129 | A1 * | 7/2020 | Sutherland | B60B 7/20 |
| 2020/0329937 | A1 * | 10/2020 | Sheikh | G05D 1/0274 |

FOREIGN PATENT DOCUMENTS

| | | | | |
|---|---|---|---|---|
| CN | 109008828 | A * | 12/2018 | A47L 11/24 |
| CN | 112716398 | A * | 4/2021 | |
| CN | 113616124 | A * | 11/2021 | |
| CN | 113712469 | A * | 11/2021 | |
| JP | 2014/014560 | A | 1/2014 | |
| JP | 2014014560 | A * | 1/2014 | |
| WO | WO-2014143315 | A1 * | 9/2014 | G01C 22/02 |
| WO | WO 2016/093910 | A1 | 6/2016 | |
| WO | WO 2016/116222 | A1 | 7/2016 | |
| WO | WO 2016/116223 | A1 | 7/2016 | |
| WO | WO-2016116222 | A1 * | 7/2016 | A47L 5/22 |
| WO | WO-2016116223 | A1 * | 7/2016 | A47L 5/22 |

OTHER PUBLICATIONS

European Search Report for EP Application No. 18201013.2 dated Mar. 14, 2019; 9 pages.

European Patent Office, Extended European Search Report, EP Patent Application No. 18201529. 7, Apr. 3, 2019, seven pages.

United States Office Action, U.S. Appl. No. 16/162,463, Nov. 19, 2020, 13 pages.

* cited by examiner

ROBOTIC APPARATUS, METHOD, AND APPLICATIONS

CROSS-REFERENCE TO RELATED APPLICATION

This application is a continuation of U.S. Application Ser. No. 16/162,463, filed on Oct. 17, 2018, now U.S. Pat. No. 11,058,270, which claims priority to U.S. Provisional Patent Application Ser. No. 62/573,355, filed on Oct. 17, 2017 and entitled "Robotic Apparatus, Method, and Applications," and U.S. Provisional Patent Application Ser. No. 62/574,255, filed Oct. 19, 2017 and entitled "Suspension System, Methods, and Applications," all of which are incorporated herein by reference in their entirety for all purposes.

FIELD OF THE INVENTION

The present disclosure is directed generally to a robotic apparatus and associated methods and applications; more particularly to a robotic floor cleaning apparatus and associated methods and applications; most particularly to a robotic floor cleaning apparatus with holonomic drive and associated methods and applications.

BACKGROUND

Cleaning patterns available to be executed with existing robotic floor cleaners are limited by their architecture, control, sensing and drive systems. Commercial robotic vacuum cleaners such as the Dyson® Eye, the Roomba®, and many of Samsung's models use a non-holonomic drive system; i.e., the drives use two independently powered wheels and a caster to provide 3-point support for their robotic vacuum cleaners. The two independently powered wheels can be used to move the robot body in a straight line, a curved line, or to spin; however, each of these drive systems are only able to move the robotic vacuum cleaner in a direction that is not perpendicular to the assigned (fixed) orientation of the robotic vacuum cleaner.

When non-holonomic robots move, e.g., northerly and then easterly, the robot must drive north, spin 90 degrees to the right, and drive east or, alternatively; they could drive north, rotate 90 degrees to the right while moving forward through an arc, and then drive east. In any case, the non-holonomic drive robotic vacuum cleaner began facing in one direction (e.g., north, south, east, west) and finished facing in a different direction, e.g., (east, west).

A robotic vacuum cleaner equipped with a holonomic drive can drive in a given direction, e.g., north (with its assigned orientation being north) and move in a different direction, e.g., east, north-east, or any direction) while maintaining its assigned orientation or that of any desired portion of the robot such as an intake, bank of sensors, or any other portion of the robot that is needed for a particular maneuver.

Accordingly, there is a need in the art for a robotic vacuum cleaner to be able to maintain its assigned orientation independent of the direction it is travelling.

SUMMARY

The present disclosure is directed to a robotic vacuum cleaner equipped with a holonomic drive that can drive in a given direction, e.g., north (with its assigned orientation being north) and move in a different direction, e.g., east, north-east, or any direction) while maintaining its assigned orientation or that of any desired portion of the robot such as an intake, bank of sensors, or any other portion of the robot that is needed for a particular maneuver.

Moreover, advantages and benefits are realized by a robotic vacuum cleaner (or floor cleaner) having enhanced cleaning and maneuvering capability enabled by an omnidirectional and holonomic drive platform exhibiting decoupled rotational and translational degrees of freedom. The advantages of being able to uniquely maneuver a robotic floor cleaner with holonomic drive can be exploited during spot cleaning, cleaning the edges of an area, putting sensors in places they are needed, navigating obstacles, and others that would be recognized by those skilled in the art to realize more efficient cleaning.

According to an aspect is a robotic vacuum cleaner, comprising: a main body having a front, top and bottom; a vacuum source positioned at the front of the main body; a plurality of sensor elements mounted to the main body; a plurality of wheel assemblies that collectively form a holonomic drive, each wheel assembly comprising: a motor; a drive wheel connected to the motor; an encoder; and a motor controller; and a main controller that receives odometry data from the motor controller in regard to the movement of the wheel, and data from the plurality of sensors, and provides electronic navigation control to the plurality of wheel assemblies.

According to an embodiment, each of the wheel assemblies further comprises a motor pod into which the motor fits.

According to an embodiment, each of the wheel assemblies further comprises a slotted motor hub that transmits torque to the drive wheel.

According to an embodiment, each of the wheel assemblies further comprises a snap clip that attaches the motor hub to the drive wheel.

According to an embodiment, each motor controller independently controls a respective one of the motors to operably form a holonomic drive.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

Figure 1:
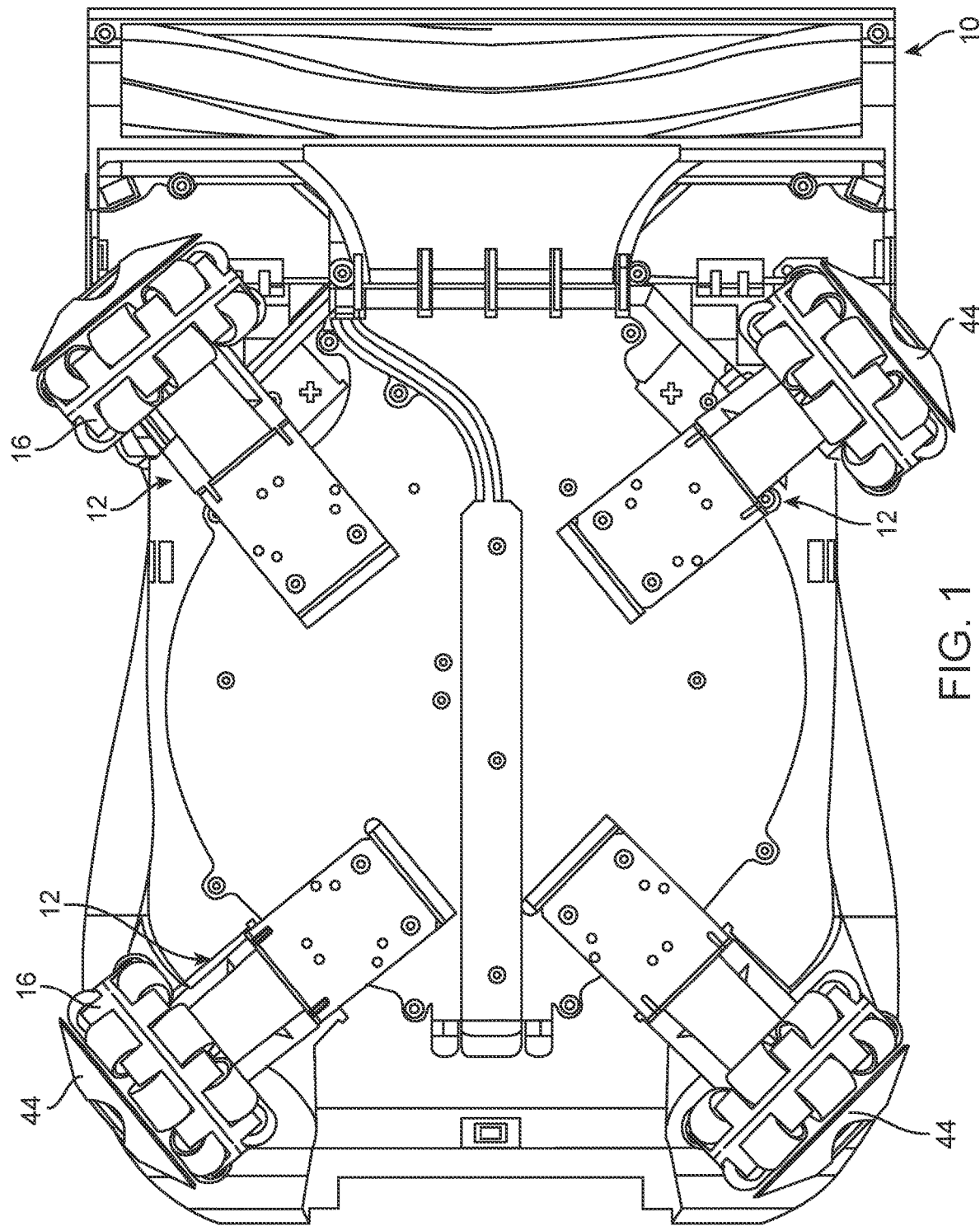
FIG. 1 is a schematic bottom plan view of a holonomic drive platform of a robotic floor cleaner, in accordance with an embodiment.

The present disclosure describes a robotic vacuum cleaner, designated generally by reference numeral 10.

Referring to FIG. 1, in one embodiment, is a schematic bottom plan view of a holonomic drive platform of a robotic floor cleaner (i.e., the 'robot') 10 according to an illustrative embodiment of the invention. The illustrated robot 10 includes four (4) omni wheel assemblies 12 each having an independent drive motor 14 for the drive wheels 16 and suspension 18 (details of the suspension 18 can be found in Applicant's provisional application Ser. No. 62/574,255, filed Oct. 19, 2017, the entirety of which is hereby incorporated by reference. Embodiments can be enabled with three (3) or four (4) wheel assemblies 12 so long as they are in a proper configuration as one skilled in the art would appreciate. The wheel assemblies 12 are arranged such that the robot 10 is positionally stable and can be directed to move in any directions (straight and/or curvilinear) by varying the speed and direction of rotation of the drive wheels 16 in each wheel assembly 12. In the apparatus in FIG. 1, driving all four wheel assemblies 12 in the same direction causes rotation of the robot 10. If the wheels 16 on one side turn one direction and the wheels 16 on the other side turn in the opposite direction, the robot 10 drives forward or backward. Driving a pair of diagonally opposed wheel assemblies 12 in the one direction and the other pair of diagonally opposed wheel assemblies 12 in the opposite direction the robot 10 will move linearly sideways. Various combinations of the wheel assembly 12 drive motions allows for robot motion in any direction with any rotation (including no rotation at all).

Figure 2:
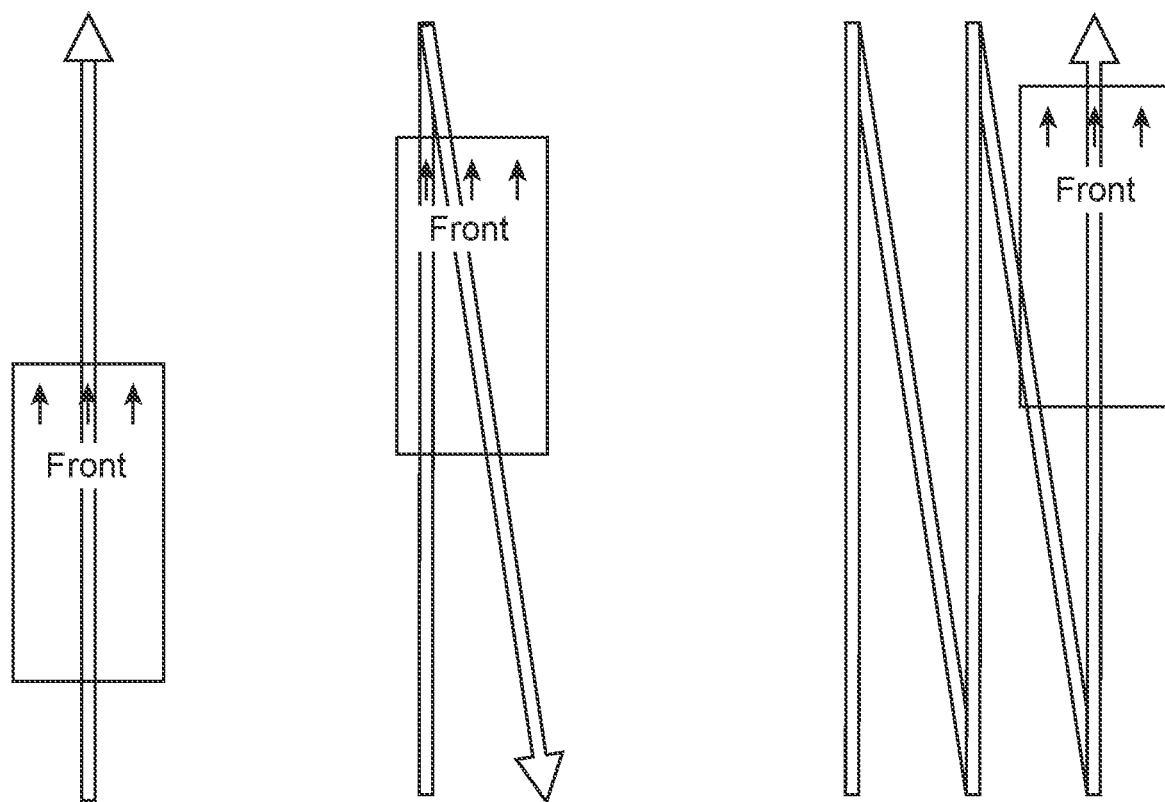
FIG. 2 illustrates the common N-pattern that is frequently used when vacuuming a floor using a conventional hand-operated vacuum cleaner or other floor cleaner.

FIG. 2 illustrates the common N-pattern that is frequently used when vacuuming a floor using a conventional hand-operated vacuum cleaner or other floor cleaner. The embodied robot 10 with a holonomic drive can cover the N-pattern, for example, while maintaining the orientation of the cleaning intake 18 (FIG. 1). This pattern/orientation may be very useful for cleaning the edge regions of a floor bounded by a wall or border. Additionally, the amount of turning the robot 10 must do throughout the cleaning of a room is reduced, lowering the overall time to clean.

Wheel Drive

Figure 3:
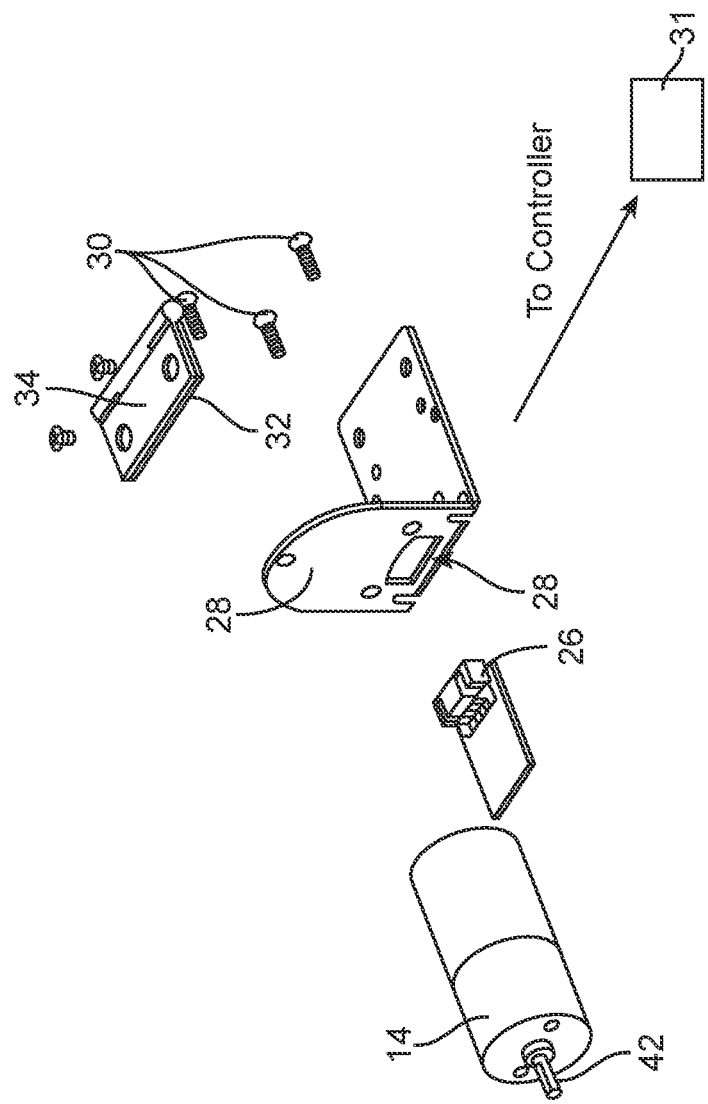
FIG. 3 is an exploded perspective view of a wheel assembly, in accordance with an embodiment.
Figure 3:
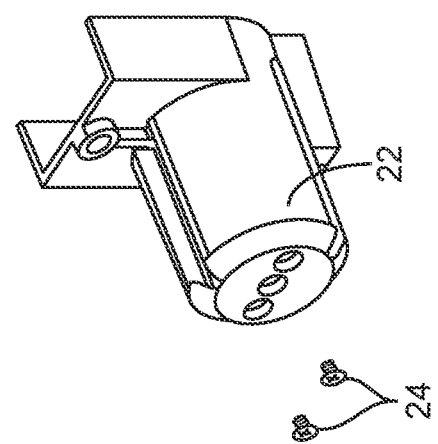
Figure 4:
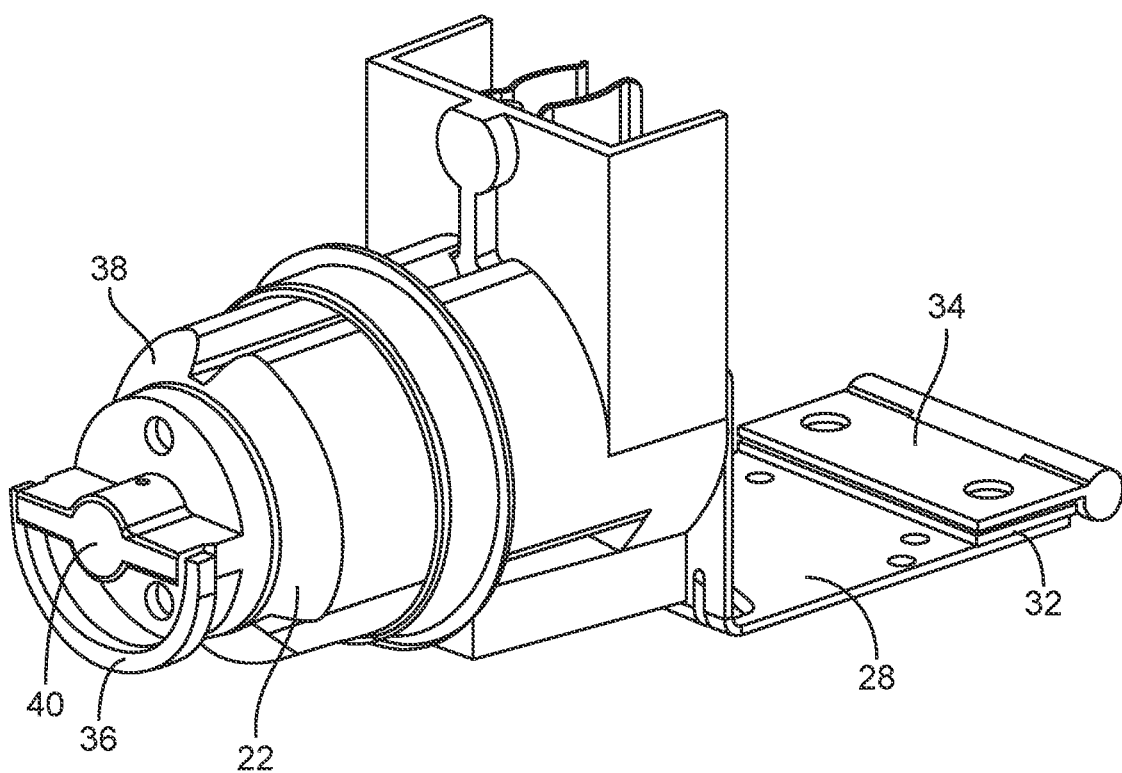
FIG. 4 is a perspective view of a wheel assembly, in accordance with an embodiment.

Each of the four wheel bracket assemblies 12 illustrated in FIGS. 3 and 4 are of identical physical construction. A DC gear motor 14 is mounted within a plastic molded motor pod 22 and secured with screws 24. A motor controller PCBA 26 slides within the motor pod 22. A harness (not shown) connects the motor 14 to the motor controller 26. The motor bracket 28 is fixed to the motor pod 22 with three self-tapping screws 30. The bracket 28 secures the motor controller 26. An access hole 30 in the bracket 28 allows connection of a harness that connects to the main logic controller 31 of the robotic floor cleaner 10. One side of the hinge 32 is secured to the bracket 28 and the other side of the hinge 34 is fixed to the robotic cleaner's base plate/suspension 18.

The motor pod 22 provides support for a suspension spring clip 36. A drive hub 38 is pressed to the end of the motor 14. Additionally, a dowel pin 40 can further reinforce the coupling of the gear motor 14 to the drive hub 38 by pressing through the motor hub 38 and pressing into the motor shaft 42. The motor hub 38 transmits torque to the drive wheel 16 through its slotted shape. A pod ring 44 of special lubricated material may be used to support the wheel 16 and provide a low friction bearing surface.

Figure 5:
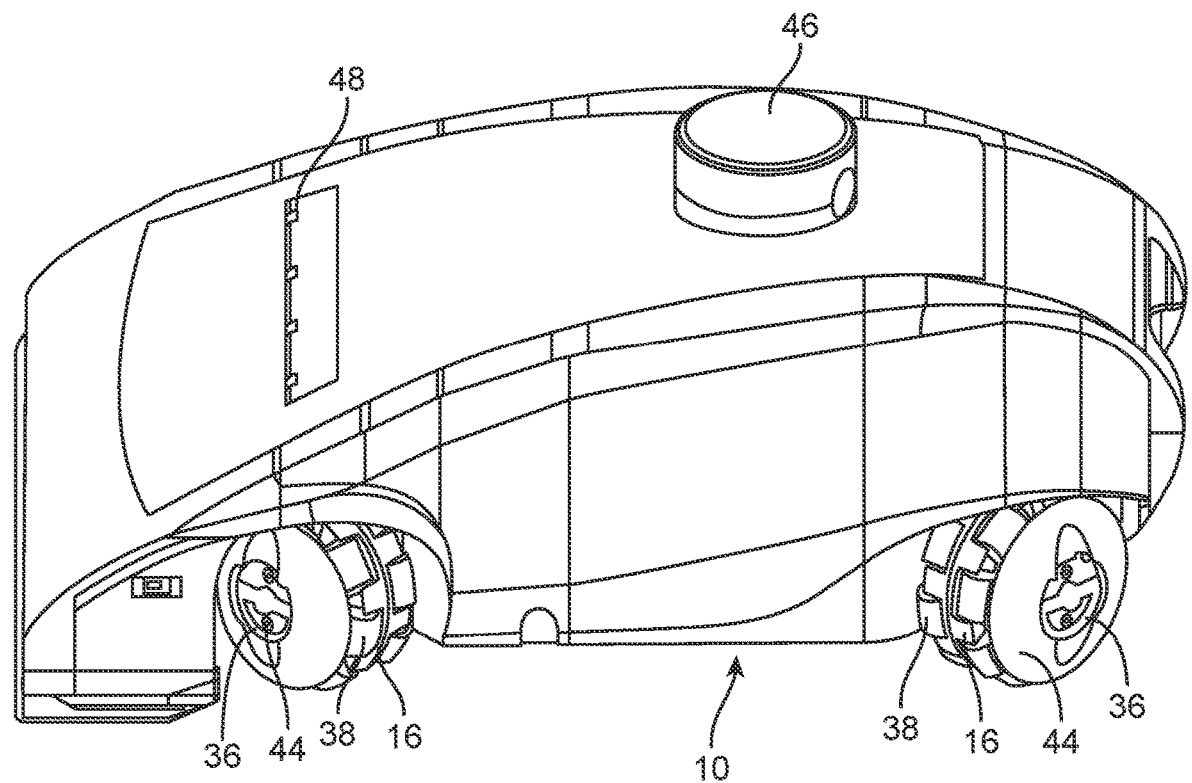
FIG. 5 is a perspective view of a robotic floor cleaner, in accordance with an embodiment.

In FIG. 5 the robotic floor cleaner 10 is shown with wheels 16 fully installed. The snap clips 36 (FIG. 4) are used to secure the wheel 16 to the drive hub 38 in an easily removable manner.

Each robotic wheel 16 includes a reversible motor and encoder. The encoder signal provides feedback to the motor's controller 26. The motor controllers 26 communicate with the main controller 31 to provide odometry data on the movement of the wheel 16. The odometry information, coupled with feedback from a LIDAR 46 mounted atop robot 10 and other sensors 48 provide data to the main controller 31 advantageous for navigation.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A robotic vacuum cleaner, comprising:
   a. a vacuum source positioned at a front of the robotic vacuum cleaner;
   b. a plurality of sensor elements mounted to the robotic vacuum cleaner;
   c. a first pair of diagonally opposed wheel assemblies and a second pair of diagonally opposed wheel assemblies that collectively form a holonomic drive, wherein the first pair of diagonally opposed wheel assemblies are perpendicular to the second pair of diagonally opposed wheel assemblies, each wheel assembly comprising a motor, a drive wheel coupled to the motor, and a motor controller; and
   d. a main controller that generates navigation instructions based on the odometry data from the motor controllers corresponding to movement of the wheel assemblies and data from the plurality of sensors, and provides the navigation instructions to the wheel assemblies;
   e. wherein the robotic vacuum cleaner is configured such that it can drive in a first direction and move in a second, different direction, while maintaining an assigned orientation.

2. The robotic vacuum cleaner of claim 1, wherein each of the wheel assemblies further comprises a motor pod into which the motor fits.

3. The robotic vacuum cleaner of claim 2, wherein each of the wheel assemblies further comprises a slotted motor hub that transmits torque to the drive wheel.

4. The robotic vacuum cleaner of claim 3, wherein each of the wheel assemblies further comprises a snap clip that attaches the motor hub to the drive wheel.

5. The robotic vacuum cleaner of claim 1, wherein each motor controller independently controls a respective one of the motors to operably form a holonomic drive.

* * * * *